Dec. 14, 1954   J. RORK   2,696,800
AQUARIUM FOR KEEPING LIVE LOBSTERS AND THE LIKE
Filed Sept. 14, 1951   2 Sheets-Sheet 1

INVENTOR.
JOHN RORK
BY
R. D. Matthews
AGENT.

Dec. 14, 1954  J. RORK  2,696,800
AQUARIUM FOR KEEPING LIVE LOBSTERS AND THE LIKE

Filed Sept. 14, 1951  2 Sheets-Sheet 2

INVENTOR.
JOHN RORK
BY
R. D. Matthews
AGENT.

United States Patent Office 2,696,800
Patented Dec. 14, 1954

2,696,800

AQUARIUM FOR KEEPING LIVE LOBSTERS AND THE LIKE

John Rork, Shelter Island, N. Y.

Application September 14, 1951, Serial No. 246,612

3 Claims. (Cl. 119—5)

This invention relates to an aquarium for keeping lobsters and similar edible crustaceans alive and in vigorous condition while being held in restaurants and markets until served or sold.

It is well known that lobsters should be in the above condition when boiled, broiled or otherwise prepared for eating to possess their finest flavor and be most digestible. To prolong the peak vitality of lobsters beyond a very short time after removal from the ocean requires keeping them in clean, constantly moving, uncontaminated, and preferably aerated, natural or synthetic sea water maintained at a temperature of about 50° F. But this can rarely be done in places where most lobsters are served or sold. Ordinarily, they are merely kept on cracked ice pending use for this purpose, or in a tank containing cold synthetic sea water, which becomes stagnant and contaminated by contact with metallic parts of the tank, as well as from the excretions of the lobsters. Their life and vigorous condition in this extremely artificial environment is of relatively short duration and, especially after shipment to distant points, many die or greatly deteriorate in vitality before they are needed for use. This results in loss to the restaurant or market owner and unsatisfactory food quality of the lobsters, which discourages the advisability of making them more readily available, particularly in places distant from the point of shipment or where prime food quality is essential.

It is an object of the present invention to provide an aquarium for live lobsters and the like in which the natural environment of the lobster is closely simulated.

Another object of the invention is the provision of an aquarium as above described containing synthetic sea water maintained at the proper temperature, constantly kept in motion and continuously filtered and aerated.

Still another object of the invention is the provision of an intercommunicating double-compartment aquarium provided with a novel device for continuously bailing a fluid medium from one compartment and pouring it into the other to cause aeration and constant flow of the fluid medium through the compartments.

A further object of the invention is to provide an aquarium of the type described in which the synthetic sea water or similar fluid medium can be easily replenished or replaced with a fresh supply whenever necessary.

These and other objects of the invention will be apparent to those skilled in the art from a study of the following description taken with the accompanying drawings in which.

Figure 1:
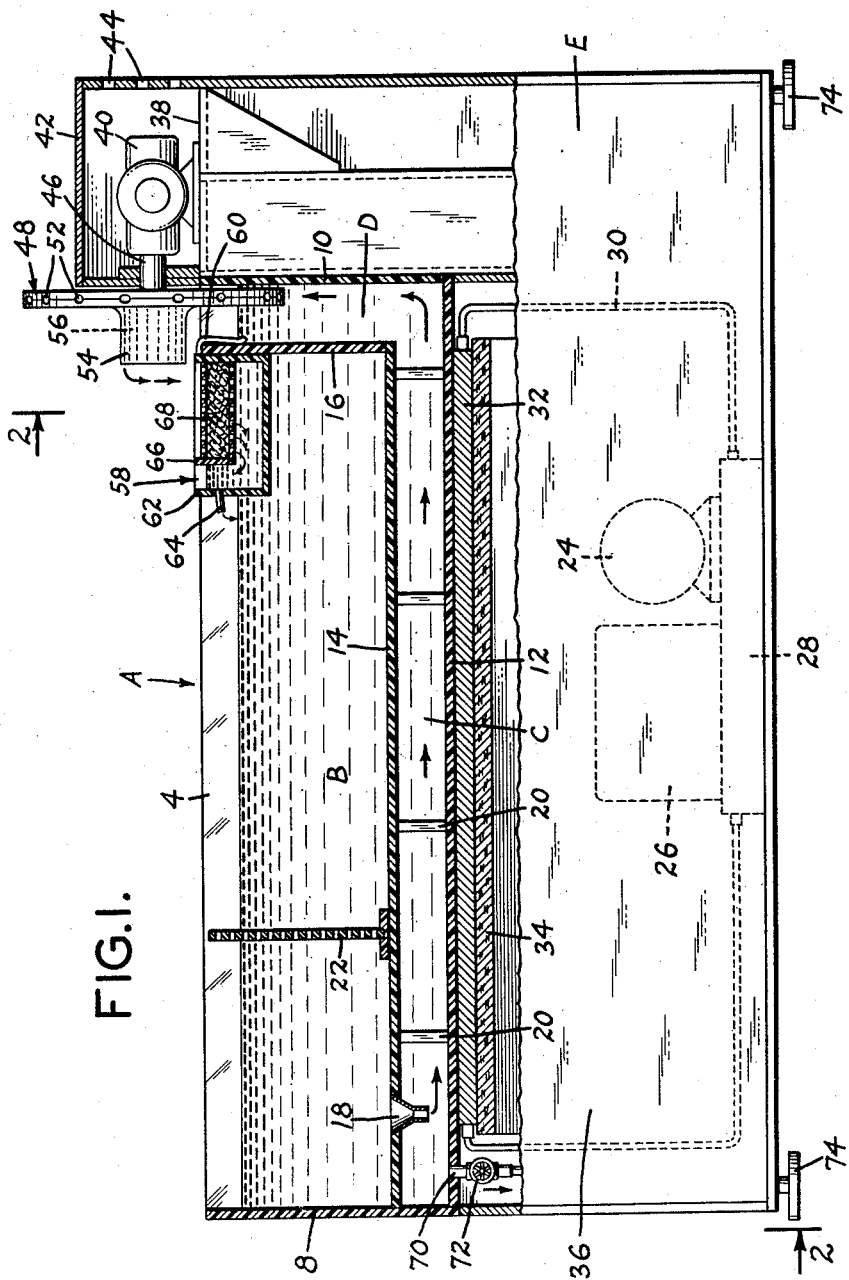
Fig. 1 is a side elevational view of the aquarium structure partly broken away and showing the aquarium proper in longitudinal section.

Referring now more in detail to the drawings, the aquarium generally indicated at A comprises side walls 4, 6, end walls 8, 10 and a bottom 12. An inner imperforate bottom wall 14, spaced above the bottom 12, is joined to end wall 8 and side walls 4, 6 and terminates short of the opposite end wall 10. Joined to this inner bottom wall 14 and also to side walls 4, 6, is an inner vertical wall 16 spaced from and in part coextensive with the end wall 10, dividing the aquarium A into inner and outer compartments B and C, respectively, with common side walls and one common end wall. All of these walls are made of transparent non-metallic material, such as one of the well-known plastics, which does not deleteriously affect or alter the composition of the synthetic sea water or similar fluid medium D contained in the aquarium compartments.

The synthetic sea water contains salts and certain other ingredients such as are found in natural sea water and quite necessary to the continued good health of the lobster. In conventional tanks heretofore used, there are at least some metallic parts with which the sea water comes in contact, causing a corrosive action that contaminates the sea water and, consequently, hastens deterioration of the condition of the lobsters contained in it. This alone has been a serious problem preventing the storage of live lobsters for any length of time and successfully preserving their prime condition until served or sold. In the aquarium of the present invention, there are no metallic parts with which the sea water comes in contact. The bottom wall 14 of inner compartment B is provided with a plastic outlet 18 adjacent the end wall 8 opening into the outer compartment, and is reinforced by spaced supports 20, also of plastic or similar material. One or more movable perforated plastic partitions 22 may be provided in the compartment B for separating different shipments and sizes of lobsters.

The sea water in the aquarium is maintained at the proper temperature of approximately 50° F. by any suitable cooling apparatus such as that generally indicated at E which serves as a support on which the aquarium is mounted. The cooling unit E comprises a motor 24, conventional compressor 26, supported on a base 28 and is provided with tubing 30 for circulating a refrigerant, such as Freon or the like, through a hollow cold plate 32, preferably made of stainless steel or hard aluminum, on which the aquarium rests. The cold plate 32 in turn rests on an insulating sheet 34 made of cork or other suitable material supported within the unit E. The entire cooling apparatus is supported by framework (not shown) and enclosed by a casing 36 shown in the drawings as partially broken away to more clearly disclose the apparatus. The frame structure is built up at one end of the aquarium to provide a supporting shelf 38 on which is mounted a small motor 40 enclosed by a housing 42 provided with ventilating apertures 44. The shaft 46 of the motor extends through the housing 42 and carries a fluid bailing wheel 42 arranged with its lower portion immersed in the fluid medium D of the outer compartment C.

Figure 2:
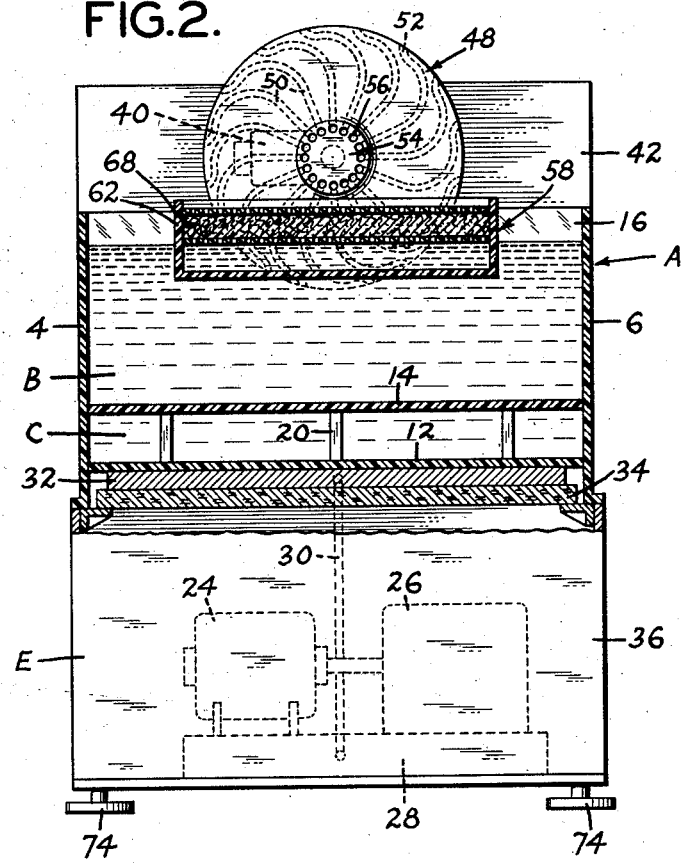
Fig. 2 is a partly transverse sectional and end elevational view of the aquarium structure taken approximately on the line 2—2 of Fig. 1.
Figure 3:
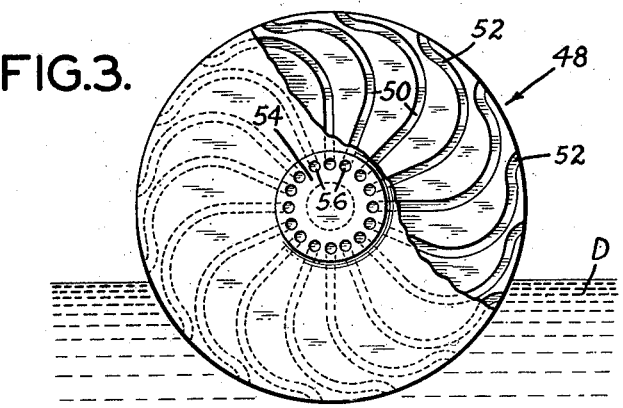
Fig. 3 is an enlarged front view of the fluid bailing device partly broken away to more clearly disclose its structure.

The fluid bailing wheel 48 is formed to provide therein a plurality of radially extending channels or conduits 50 having curve-ended portions 52. The hub 54 of the bailing wheel 48 is formed with a like number of annularly arranged axially extending channels 56 each communicating with a radially extending channel 50. The hub 54 is of such length that the axially extending channels 56 formed therein and running through it terminate at a point adjacent the top of the inner compartment B. It will be seen that during rotation of the bailing wheel 48 by the motor 40 at any predetermined controlled speed, counter-clockwise as viewed in Fig. 2, the curve-ended radiating channels 50 will constantly dip into the fluid contained in outer compartment C. The fluid will thus be scooped up or bailed from the compartment C and flow by gravity, as the wheel 48 rotates, out through the axially extending channels 56 in the hub 54, from which it pours in a continuous stream into the compartment B, as indicated by the arrows in Fig. 1. This bailing of the fluid medium from the outer compartment C and pouring it into the inner compartment B induces a continuous flow of the fluid from the inner compartment through the outlet 18 back into the outer compartment C, as also indicated by arrows in Fig. 1. Thus, a continuous cycle of interchange and movement of the fluid medium between the compartments is effected. In addition, pouring of the fluid tends to impart desirable aeration thereto, which gives to the synthetic fluid medium a characteristic further simulating the condition of natural sea water.

The aquarium is provided with filter means 58 supported on the vertical wall 16 of the inner compartment B by a hanger bracket 60. All parts of the filter 58 are non-metallic and it comprises a receptacle 62 having an inclined spout 64, of plastic or similar material. Within the receptacle 62 is arranged a perforated enclosure 66 containing glass wool or other suitable non-metallic filtering material 68. The bottom 12 of the outer compartment C is provided adjacent the end wall 8 with a drain pipe 70 and valve 72. The drain pipe 70 and valve 72 may be made of any suitable non-metallic material, such as plastic or wood, and in fact this valve may be a conventional wooden spigot or the like. Adjustable levelling devices 74 are provided on the bottom corners of the aquarium structure for the usual purpose of compensating for unevenness in the floor or other supporting surface.

It will be seen from the foregoing description that an aquarium has been provided having double compartments and means for causing a continuous flow or interchange of fluid medium between the compartments. The fluid medium is continuously aerated and filtered during its passage from one compartment to the other, providing a clean fluid medium at all times beneficial to the healthy condition of the lobsters contained therein. Further, since the synthetic sea water at no time comes in contact with any metallic parts of the aquarium, the water remains uncontaminated by any corrosive action. Used fluid medium is easily replenished whenever necessary by merely plugging the outlet 18 and draining the outer compartment C through the valve 72. The fresh supply of sea water put in the outer compartment C thus mixes with that in the inner compartment B after removal of the plug (not shown) from outlet 18 and resumption of operation. The entire contents of both compartments of the aquarium may also be easily and quickly drained through the valve 72 and replaced with a fresh supply of sea water.

The invention may be modified in various respects as will occur to those skilled in the art and the exclusive use of all modifications as come within the scope of the appended claims is contemplated.

What is claimed is:

1. In an aquarium having side walls, end walls and a bottom forming in part an outer compartment, an inner bottom wall spaced above said bottom and an inner vertical wall spaced from one of said end walls forming with said side walls and the other of said end walls an inner compartment in said aquarium, said inner bottom wall being provided with an outlet from said inner compartment into said outer compartment, means for continuously bailing fluid from the outer compartment and pouring it into the inner compartment to induce aeration and flow of fluid through said outlet from the inner to the lower compartment comprising a wheel member mounted between said one end wall and said inner vertical wall provided with a plurality of radially extending curve-ended channels adapted to dip into the fluid contained in said outer compartment, and a like number of annularly arranged axially extending channels in the hub of said wheel member each communicating with a radially extending channel and terminating adjacent the top of said inner compartment.

2. In combination with a cooling apparatus having a cold plate providing a support for an aquarium, an aquarium mounted on said cold plate having side walls, end walls and a bottom forming in part an outer compartment, an inner bottom wall spaced above said bottom and an inner vertical wall spaced from one of said end walls forming with said side walls and the other of said end walls an inner compartment in said aquarium, said inner bottom wall being provided with an outlet from said inner compartment into said outer compartment, means for continuously bailing fluid from the outer compartment and pouring it into the inner compartment to induce aeration and flow of fluid through said outlet from the inner to the outer compartment comprising a wheel member mounted between said one end wall and said inner vertical wall provided with a plurality of radially extending curve-ended channels adapted to dip into the fluid contained in said outer compartment, and a like number of annularly arranged axially extending channels in the hub of said wheel member each communicating with a radially extending channel and terminating adjacent the top of said inner compartment.

3. In combination with a cooling apparatus having a cold plate providing a support for an aquarium, an aquarium mounted on said cold plate having side walls, end walls and a bottom forming in part an outer compartment, an inner imperforate bottom wall spaced above said bottom and an inner vertical wall spaced from and in part coextensive with one of said end walls forming with said side walls and the other of said end walls an inner compartment in said aquarium, said inner bottom wall being provided with an outlet from said inner compartment into said outer compartment, and means for continuously bailing fluid from the outer compartment and pouring it into the inner compartment to induce aeration and flow of fluid through said outlet from the inner to the outer compartment comprising a rotary member formed to provide channels connecting the perifery and hub thereof located with the latter positioned above the top of the inner compartment and with its perifery partly immersed in the fluid of said outer compartment.

References Cited in the file of this patent

UNITED STATES PATENTS

| Number | Name | Date |
|---|---|---|
| 431,686 | Carmichael | July 8, 1890 |
| 723,341 | Toups | Mar. 24, 1903 |
| 1,007,383 | Parry | Oct. 31, 1911 |
| 1,108,675 | Beck | Aug. 25, 1914 |
| 1,838,215 | DeClairmont | Dec. 29, 1931 |
| 2,007,479 | Salles et al. | July 9, 1935 |
| 2,265,806 | Goldschmied | Dec. 9, 1941 |
| 2,272,582 | Poppe | Feb. 10, 1942 |

FOREIGN PATENTS

| Number | Country | Date |
|---|---|---|
| 50,777 | Germany | Feb. 12, 1890 |
| 369,983 | France | Dec. 3, 1906 |
| 7,783 | Great Britain | 1913 |
| 346,564 | Great Britain | Apr. 16, 1931 |
| 557,068 | Germany | Aug. 18, 1932 |
| 58,996 | Norway | June 7, 1938 |
| 60,157 | Norway | Nov. 21 1938 |